United States Patent [19]

Matsuoka et al.

[11] Patent Number: 5,738,066
[45] Date of Patent: Apr. 14, 1998

[54] PISTON STRUCTURE WITH HEAT INSULATED COMBUSTION CHAMBER

[75] Inventors: Hiroshi Matsuoka, Yamato; Takahiro Tsubonuma, Yokohama, both of Japan

[73] Assignee: Isuzu Motors Limited, Tokyo, Japan

[21] Appl. No.: 766,669

[22] Filed: Dec. 13, 1996

[30] Foreign Application Priority Data

Dec. 20, 1995 [JP] Japan .................... 7-348571

[51] Int. Cl.⁶ .................... F02F 3/26; F02B 23/06
[52] U.S. Cl. .................... 123/254; 123/271; 123/276
[58] Field of Search .................... 123/254, 270, 123/271, 276, 279, 262

[56] References Cited

U.S. PATENT DOCUMENTS

| | | | |
|---|---|---|---|
| 5,425,337 | 6/1995 | Matsuoka | 123/262 |
| 5,483,933 | 1/1996 | Kawamura | 123/254 |
| 5,520,148 | 5/1996 | Kawamura et al. | 123/254 |

FOREIGN PATENT DOCUMENTS

| | | | |
|---|---|---|---|
| 0675273 | 10/1995 | European Pat. Off. | F02B 23/06 |
| 471839 | 1/1929 | Germany . | |
| 3714400 | 11/1987 | Germany | F02F 3/00 |
| 50-073704 | 6/1975 | Japan . | |
| 8-068328 | 3/1996 | Japan . | |
| 868328 | 12/1996 | Japan | F02B 19/16 |
| 312018 | 5/1929 | United Kingdom . | |
| 408808 | 4/1934 | United Kingdom . | |
| 1527791 | 10/1978 | United Kingdom | F02F 3/12 |
| 1534761 | 12/1978 | United Kingdom | F02B 19/14 |

OTHER PUBLICATIONS

Japan Abstract, JP-A-05 010209, Jan. 19, 1993.
Japan Abstract, JP-A-63 176621, Jul. 20, 1988.

*Primary Examiner*—Andrew M. Dolinar
*Assistant Examiner*—Hieu T. Vo
*Attorney, Agent, or Firm*—Browdy and Neimark

[57] ABSTRACT

In this piston structure with a heat insulated combustion chamber, a combustion chamber structure is fixed to a piston body stably and firmly by a pre-stressed holding member. The combustion chamber structure which constitutes a combustion chamber provided on an outer circumferential part of a lower portion thereof with a flange made integral therewith, and which comprises a heat resisting material, is fixed by a holding member fused to the piston body. After the piston body and holding member have been welded, the holding member is pre-stressed by a press so that the fixed condition of the combustion chamber structure with respect to the piston body during an operation of the engine is stabilized.

20 Claims, 4 Drawing Sheets

PISTON STRUCTURE WITH HEAT INSULATED COMBUSTION CHAMBER

BACKGROUND OF THE INVENTION

1. Field of the Invention

This invention relates to a piston structure with a heat insulated combustion chamber in which a combustion chamber of a heat insulated structure is provided in a piston body.

2. Description of the Prior Art

The conventional pistons for diesel engines include the piston disclosed in Japanese Utility Model Laid-Open No. 73702/1975. This piston for diesel engines is produced by fitting a hot metal, which has a combustion chamber formed in an upper surface thereof, in a top portion of a piston body with a contact area of the hot metal with respect to the top portion of the piston body minimized.

Japanese Patent Laid-Open No. 68328/1996 discloses a combustion chamber-carrying piston structure. In this combustion chamber-carrying piston structure, the degree of thermal insulation of a combustion chamber formed in a combustion chamber structure is improved, and a difference between the thermal expansion coefficient of a metal piston body and that of the combustion chamber structure of a heat insulating material is offset by a mounting ring of a material the kind of which is substantially identical with that of the material of the piston body, whereby the combustion chamber structure and piston body are fixed to each other without causing looseness to occur. The piston structure has a cavity-carrying piston body of a metal material, and a combustion chamber structure comprising a high temperature resisting high strength material and provided in the cavity via a heat insulating air layer, the combustion chamber structure being provided with a sub-chamber in the substantially central portion of a piston, and also a nozzle insert hole and a communication hole. A mounting ring comprising a material the kind of which is substantially the same as that of the material of the piston body is hot-welded to the piston body, and the combustion chamber structure is pressed against and fixed to the surface of the cavity of the piston body by the mounting ring.

Since the combustion temperature in the swirl chamber is generally high, burning a gaseous mixture in a fuel-rich condition constitutes effective measures for reducing the emission of NOx. In order to burn a gaseous mixture in a fuel-rich condition when the combustion temperature is high, employing a sub-chamber type engine structure is effective. When an engine having a sub-chamber type combustion chamber is employed, it is necessary to increase the cross-sectional area of the communication hole via which the sub-chamber and a main chamber communicate with each other, for the purpose of increasing the combustion speed in the sub-chamber type combustion chamber to a level substantially equal to that of the combustion speed in a direct injection type combustion chamber.

In a swirl chamber type engine, emission of NOx and smoke increase unless the direction of a swirl formed in a swirl chamber, the direction of fuel spray from an injection nozzle and the timing of injection of the fuel from the injection nozzle are set suitable. Since a communication port for allowing communication between a sub-chamber and a main chamber is small in the swirl chamber type engine, a throttle loss due to the communication port occurs to cause an engine output to decrease.

In general, the communication port for allowing communication between a main chamber and a sub-chamber is provided in an outer circumferential portion of a cylinder. Therefore, a distance over which a jet has to travel becomes long, and the mixing of the fuel with air in the main chamber is not done satisfactorily, so that HC and smoke occur.

In order to solve these problems, it is conceivable in a sub-chamber type engine to provide a sub-chamber in the central portion of a cylinder, provide a plurality of communication ports via which the cylinder side main chamber and sub-chamber communicate with each other, and thus increase a total cross-sectional area of the communication ports as passages without reducing the energy injected from the sub-chamber into the main chamber through the communication ports, whereby the throttle loss due to the communication ports is reduced.

However, when the sub-chamber is formed in the substantially central portion of a cylinder, a region in which suction-exhaust ports are formed becomes small. In order to solve this problem, it is conceivable to form a sub-chamber in a piston in the sub-chamber type engine.

When a sub-chamber is formed in a piston, the radiation of heat energy from the sub-chamber causes a problem, so that employing a heat insulating swirl chamber type engine is a possible choice. This choice involves the necessity of fixing a combustion chamber structure to a piston body firmly so as to reduce the radiation of thermal energy from the combustion chamber.

During an operation of an engine, a difference in thermal expansion coefficient occurs due to a difference between the temperature of the combustion chamber structure and that of the piston body, and this difference in thermal expansion coefficient causes the looseness between the combustion chamber structure and the piston body. Therefore, how to minimize the looseness between the combustion chamber structure and piston body during an operation of the engine poses an issue.

SUMMARY OF THE INVENTION

An object of the present invention is to solve these problems, and provide a piston structure with a heat insulated combustion chamber, capable of forming a cylinder head to a simple structure by providing a combustion chamber in a piston, enabling suction ports and exhaust ports to be formed to a larger size and plurally respectively, and having a combustion chamber structure, which constitutes the combustion chamber, fixed to a piston body so that looseness does not occur, especially, during an operation of an engine.

The present invention relates to a piston structure with a heat insulated combustion chamber, comprising a piston body having a cavity in a top portion thereof and formed out of a metal material, a combustion chamber structure provided in the cavity, constituting a combustion chamber and formed out of a heat resisting material, a flange integral with the combustion chamber structure and projecting from an outer circumferential portion of a bottom wall thereof, and a holding member integral with the piston body and positioned on the outer side of an outer circumferential surface of the combustion chamber structure and above the flange, the holding member being pressed firmly (pre-stressed) so that the flange is pressed by the holding member against a bottom surface of the cavity of the piston body.

In this piston structure with a heat insulated combustion chamber, the holding member is fixed to the piston body by welding, and the combustion chamber structure is provided concentrically with the holding member, a heat insulating layer being formed between the holding member and an outer circumferential surface of the combustion chamber structure. The holding member is press-fitted into the piston body applying residual stress (pre-stress) by plastically deforming the same with the holding member fixed to the piston body.

In this piston structure with a heat insulated combustion chamber, the holding member is formed when the piston body is cast, in such a manner that the holding member becomes integral with the piston body.

Between the portion of the holding member which is in the vicinity of the flange and the surface of the cavity of the piston body, a heat insulating layer extending from the outer circumferential surface of the flange toward a top surface of a piston is formed.

Heat insulating members are interposed between the upper surface of the flange and the holding member, and between the lower surface of the flange and the piston body. A heat insulating layer is formed between the lower surface of the combustion chamber structure and the piston body.

A gasket is provided between the outer circumferential surface of the combustion chamber structure and the inner circumferential surface of the holding member.

The flange of the combustion chamber structure comprises two vertically divided portions, i.e. upper and lower flange portions. A heat insulating gasket is interposed between these upper and lower flange portions.

The combustion chamber structure is provided with a nozzle insert hole positioned in the central portion of a top wall thereof, and communication ports formed around this insert hole so that the communication ports are spaced from one another and extend in the radial direction.

This piston structure with a heat insulated combustion chamber is constructed as described above. Accordingly, even when a different in thermal expansion coefficient due to a temperature difference occurs between the piston body and the combustion chamber structure during an operation of the engine, the occurrence of looseness between the flange of the combustion chamber structure and the piston body, and the occurrence of a clearance therebetween can be prevented. The combustion chamber structure can be fixed firmly to the piston body.

Since this piston structure with a heat insulated combustion chamber is provided with a heat insulating air layer between the boundary surfaces of the combustion chamber structure and piston body, heat dissipation from the combustion chamber toward the piston body is prevented, so that the thermal efficiency can be improved.

Since the combustion chamber is positioned in the substantially central portion of the piston, a traveling distance of a jet from the communication ports is short, and the combustion time decreases, so that the performance of the output is improved with the traveling distance of a jet from the combustion chamber decreasing. This enables the cross-sectional area of the communication ports as passages to be set larger, a throttle loss to be minimized, and the efficiency to be improved.

Since this piston structure with a heat insulated combustion chamber is constructed as described above, a high degree of thermal insulation can be obtained owing to the heat insulating layer and heat insulating air layer, and the holding member positioned between the heat insulating air layer and combustion chamber structure is maintained at a high temperature. Accordingly, the holding member presses the flange owing to a difference in expansion due to a temperature difference between the holding member and piston body and the flange. Moreover, the holding member is press-fitted (pre-stressed). Therefore, looseness does not occur in the flange, and the combustion chamber structure is fixed firmly to the piston body.

When the holding member is fixed to the piston body by welding, the temperature of the holding member becomes high as compared with that of the piston body after the welding has finished, and the degree of shrinkage of the holding member becomes higher than that of the piston body after they have been cooled, so that looseness would occur between the flange and holding member.

However, the flange of the combustion chamber structure can be fixed to the piston body by a stable fixing force by prestressing the holding member by subjecting the holding member to a plastic deformation process using a hot press and a cold press after the completion of the welding of the two parts.

DESCRIPTION OF THE PREFERRED EMBODIMENTS

Figure 1:
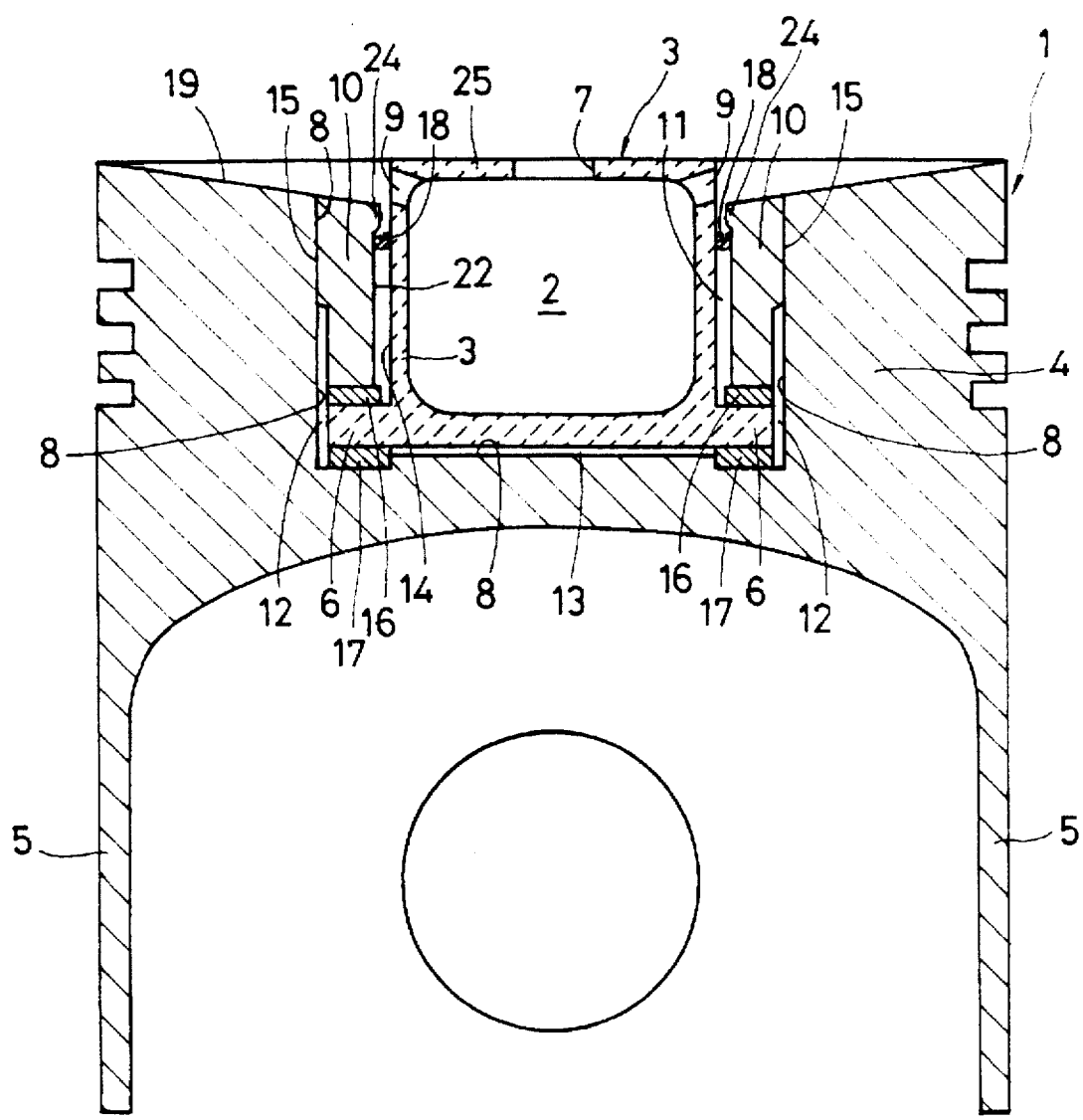
FIG. 1 is a sectional view showing an embodiment of the piston structure with a heat insulated combustion chamber according to the present invention.

The embodiments of the piston structure with a heat insulated combustion chamber according to the present invention will now be described with reference to the drawings.

This piston structure with a heat insulated combustion chamber can be incorporated into a swirl chamber type engine (not shown) having a cylinder block which comprises a metal material, for example, cast iron and an aluminum alloy, and which constitute cylinders, and a cylinder head fixed on the cylinder block via a gasket and comprising a metal material, such as an aluminum alloy. Pistons are incorporated in the cylinders formed in the cylinder block, in such a manner that the pistons are reciprocatingly moved therein.

This piston structure with a heat insulated combustion chamber comprises a piston body 1 formed of a piston head 4 and a piston skirt 5, and a combustion chamber structure 3 which is provided in a cavity 8 of the piston body 1 via heat insulating layers 11, 12, 13 so as to be positioned in the substantially central portion of the piston head 4, and which constitutes a sub-chamber, i.e. a combustion chamber 2. The piston body 1 is formed out of a metal material, such as an aluminum alloy, and the cavity 8 is formed in the central portion of the piston head 2. The combustion chamber structure 3 is formed out of a heat resisting material, such as a ceramic material including silicon nitride and sialon, and provided in its top wall 25 with a nozzle insert hole 7 positioned in the substantially central portion thereof, and a plurality of radially extending communication ports 9 arranged around the nozzle insert hole 7 so that the communication ports are spaced from one another. The combustion chamber structure 3 is provided on an outer circumferential surface of a bottom portion thereof with an outwardly extending flange 6 made integral therewith. The flange 6 has a function of fixing the combustion chamber structure 3 to the piston body 1.

This piston structure with a heat insulated combustion chamber has a holding member 10 which is provided in the portion of the cavity 8 of the piston body 1 which is on the outer circumferential side of the combustion chamber structure 3 so as to press the flange 6 against a bottom surface of the cavity 8, and which is fixed to the piston body 1. The holding member 10 is formed concentrically with the combustion chamber structure 3 via a heat insulating layer 11 formed between the holding member 10 and an outer circumferential surface 12 of the combustion chamber structure 3. The contact portions 15 of the outer circumferential surface of the holding member 10 and wall surface of the cavity 8 of the piston body 1 are fixed to each other by hot-weld, such as laser welding, whereby the holding member 10 is fixed to the piston body 1. A piston top surface 19 of the piston body 1 and holding member 10 is tapered with recession in a central portion so that the angle thereof agrees with that of gas ejection outlets of the communication ports 9.

A heat insulating layer 12 extending from the outer circumferential portion of the flange 6 toward the piston top surface 19 is formed between the portion of the holding member 10 which is in the vicinity of the flange 6 and the wall surface of the cavity 8 of the piston body 1. In order to form the heat insulating layer 12 between the wall surface of the cavity of the piston body 1 and the outer circumferential surface of the holding member 10, the outer circumferential surface, which is opposed to the side surface of the cavity 8, is undercut. Also, a heat insulating layer 13 is formed between the lower surface of the combustion chamber structure 3 and the bottom surface of the cavity 8 of the piston body 1. In order to form this heat insulating layer 13, a heat insulating member 17 is provided on the bottom surface of the cavity of the piston body 1, and the combustion chamber structure 3 is placed on the heat insulating members 17. Although the heat insulating layers 11, 12, 13 can be formed of sealed heat insulating air layers, heat insulating members of a ceramic material may be packed in these heat insulating air layers.

A heat insulating member 16 is interposed between the upper surface of the flange 6 and the holding member 10. The heat insulating member 17 is interposed between the lower surface of the flange 6 and the opposed surface of the piston body 1. The heat insulating members 16, 17 are formed out of, for example, a ceramic material including a partially stabilized zirconia PSZ. The heat insulating layer 13 is formed between the lower surface of the combustion chamber structure 3 and the piston body 1.

A heat insulating gasket 18 is provided in a clearance between the outer circumferential surface 14 of the combustion chamber structure 3 and an inner circumferential surface 22 of the holding member 10. The heat insulating gasket 18 is locked by a stepped portion 24 formed on the inner circumferential surface of the holding member 10, in such a manner that the gasket 18 does not spring out from the clearance. The heat insulating gasket 18 is formed out of a material, such as SUS and SiC. Owing to the heat insulating gasket 18 interposed between the outer circumferential surface 14 of the combustion chamber structure 3 and the inner circumferential surface 22 of the holding member 10, the flowing of a gas can be minimized, and the degree of heat insulation can be improved.

Figure 2C:
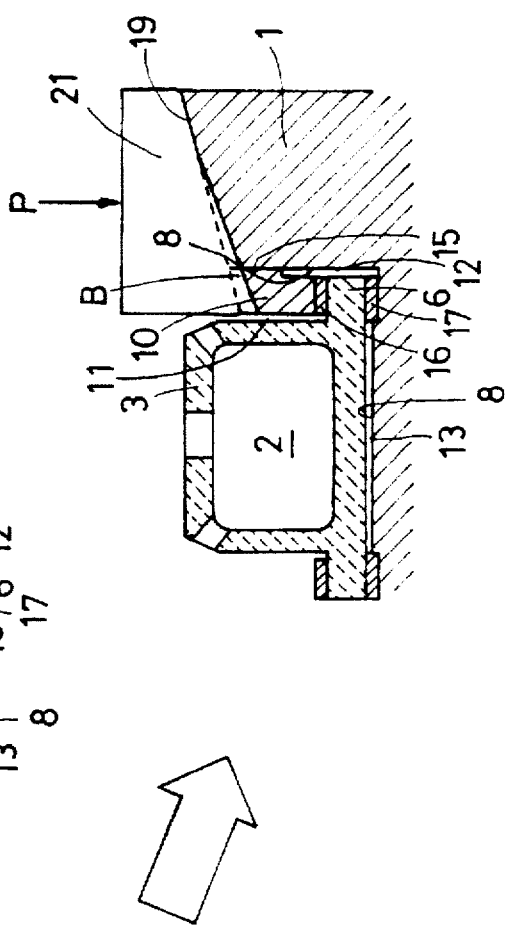
FIG. 2 is an explanatory view showing the steps of assembling the piston structure with a heat insulated combustion chamber of FIG. 1.
Figure 2B:
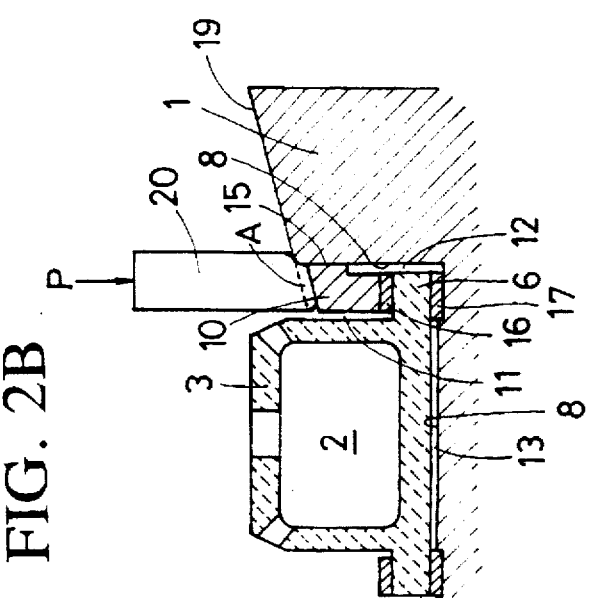
Figure 2A:
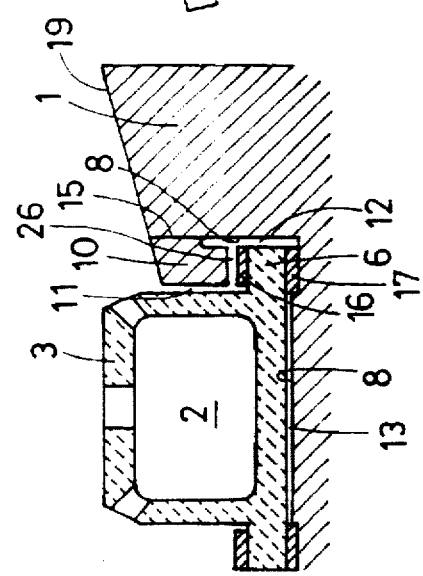

In this piston structure with a heat insulated combustion chamber, the combustion chamber structure 3 can be fixed to the inside of the cavity 8 of the piston body 1 as shown in FIG. 2. First, the combustion chamber structure 3 is provided in the cavity 8 formed in the piston body 1. The holding member 10 is then fixed at its contact portion 15 to the piston body 1 by beam welding and so on as shown in FIG. 2A. During this time, a clearance 26 occurs between the lower surface of the holding member 10 and the upper surface of the heat insulating member 16.

The holding member 10 is then subjected to partial or all-around cold or hot pressing using a pressure member 20 as shown in FIG. 2B, whereby a region A shown by broken lines of the holding member 10 is deformed plastically in part or all-around to fill up the clearance 26, the holding member 10 being further pressed, whereby pre-stress is imparted thereto.

According to another method, the combustion chamber structure 3 is provided in the cavity 8 formed in the piston body 1. The holding member 10 is then fixed at its contact portion 15 to the piston body 1 by beam welding and so on as shown in FIG. 2A. During this time, a clearance 26 occurs between the lower surface of the holding member 10 and the upper surface of the heat insulating member 16. The holding member 10 is then subjected to partial cold or hot pressing using a pressure member 21, whereby a region B shown by a broken line in the top portions of the holding member 10 and piston body 1 is deformed plastically in part to fill up the clearance 26 in the deformed portions, the holding member 10 being further pressed, whereby residual stress is imparted thereto. The plastically deformed region B is formed so as to extend radially in a plurality of positions which are spaced from one another in the circumferential direction. Since the holding member 10 is pressed partially, the clearance 26 is closed partially, and clearances 26 are left sporadically in the other portions of the holding member 10, and these sporadically remaining clearances 26 also have a function of improving the heat insulating performance.

Another embodiment of the piston structure with a heat insulated combustion chamber according to the present invention will now be described with reference to FIG. 3.

A combustion chamber structure 3 in this embodiment comprises an upper structural member 3A constituting a circumferential side portion including a top wall 25, and a lower structural member 3B constituting a bottom portion. A flange 6 in the combustion chamber structure 3 is divided vertically into two, i.e., comprises upper and lower flange portions 6A, 6B. The upper flange portion 6A projects outward from an outer circumference of a lower portion of the upper structural member 3A. The lower flange portion 6B comprises a circumferential portion of the lower structural member 3B. Since the combustion chamber structure 3 is divided into two as mentioned above, it is manufactured easily. Moreover, the upper and lower flange portions 6A, 6B are pressed against each other by the holding member 10, and the interfaces of these two flange portions are sealed excellently, so that a gas does not leak from the interfaces.

Figure 4:
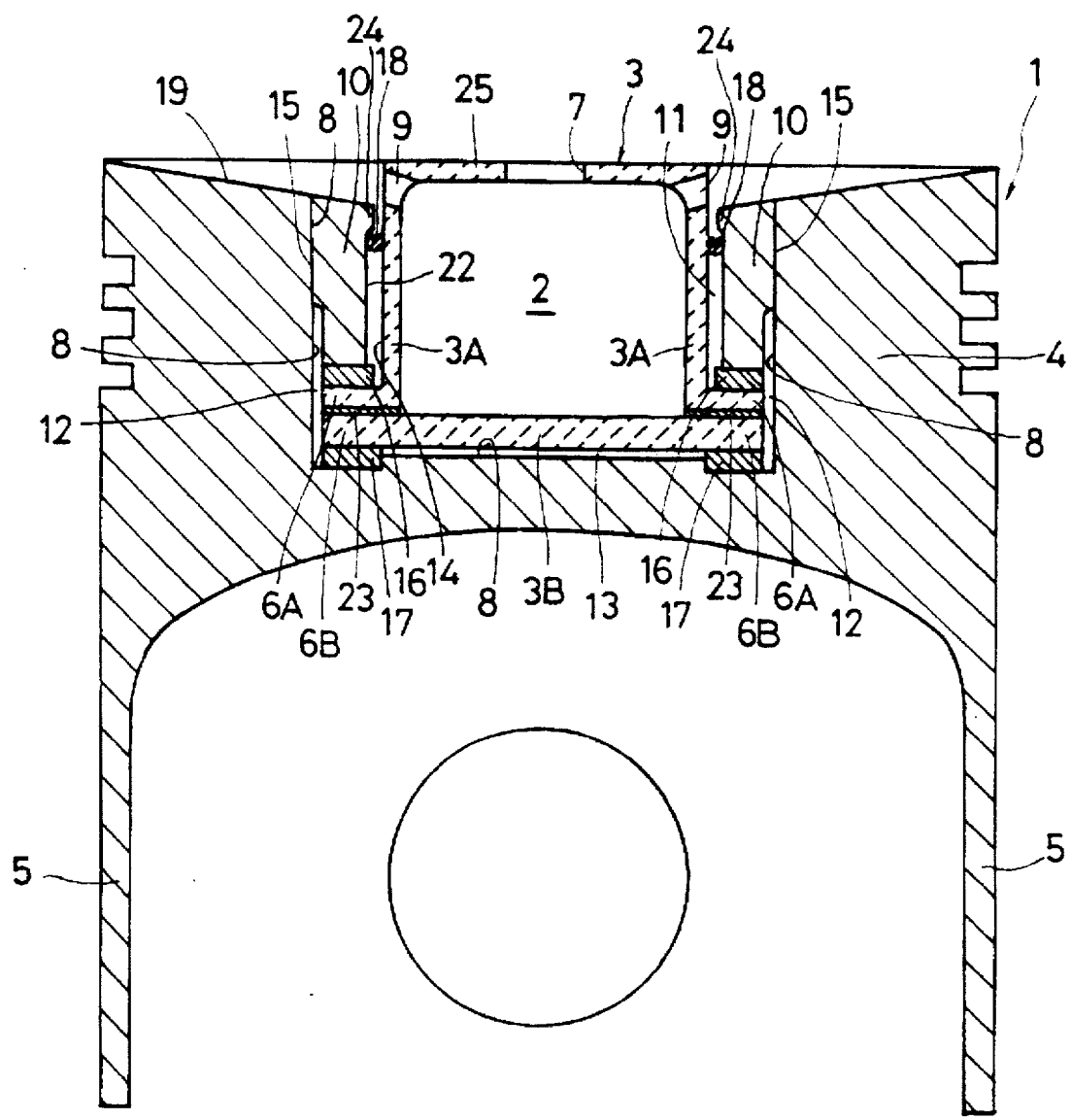
FIG. 4 is a sectional view showing still another embodiment of the piston structure with a heat insulated combustion chamber according to the present invention.

Still another embodiment of the piston structure with a heat insulated combustion chamber according to the present invention will now be described with reference to FIG. 4.

Figure 3:
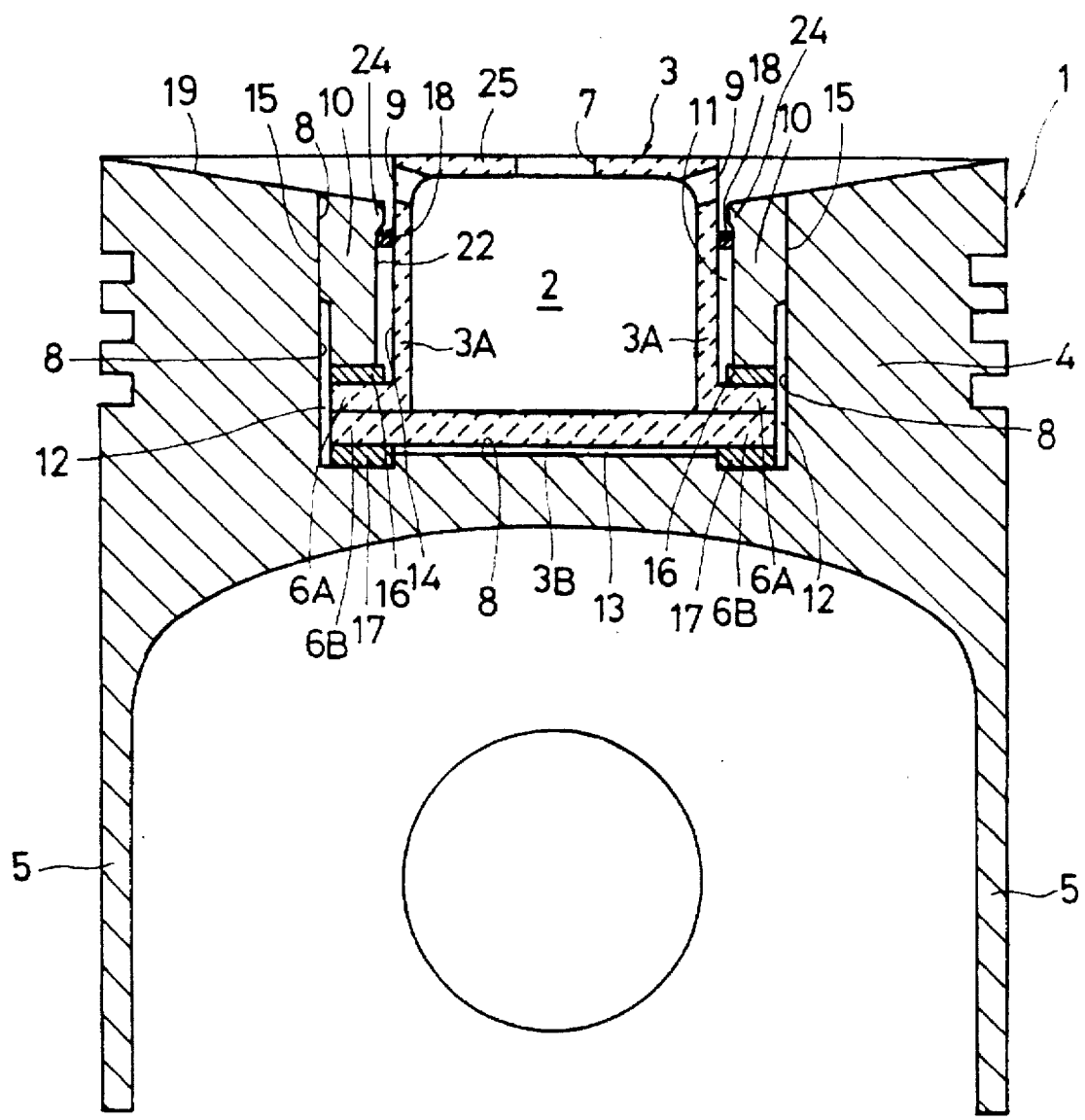
FIG. 3 is a sectional view showing another embodiment of the piston structure with a heat insulated combustion chamber according to the present invention.

A combustion chamber structure in this embodiment differs from that 3 shown in FIG. 3 in that a heat insulating gasket 23 is interposed between upper and lower flange portions 6A, 6B. Since the combustion chamber structure 3 in the embodiment of FIG. 4 is divided into two as mentioned above with the heat insulating gasket 23 interposed between the parts 6A and 6B, the irregularity of the interfaces of the two parts is offset by the heat insulating gasket 23, and the sealed condition of the structure can be improved.

What is claimed is:

1. A piston structure with a heat insulated combustion chamber, comprising a piston body provided with a cavity in a top portion thereof and formed out of a metal material, a combustion chamber structure provided in said cavity and formed out of a heat resisting material, a flange integral with said combustion chamber structure and projecting from an outer circumferential portion of a bottom wall thereof, and a holding member firmly fitted in said piston body and positioned on the outer side of an outer circumferential surface of said combustion chamber structure and above said flange, wherein said holding member is deformed plastically so that compressive residual stress is imparted in said holding member, whereby said holding member is able to hold elastically said flange of said combustion chamber structure, and said holding member being firmly pressed so that said flange is pressed by said holding member against a bottom surface of said cavity of said piston body.

2. A piston structure with a heat insulated combustion chamber according to claim 1, wherein said holding member is fixed to said piston body by welding, said combustion chamber structure is provided concentrically with said holding member, a heat insulating layer being formed between said holding member and an outer circumferential surface of said combustion chamber structure.

3. A piston structure with a heat insulated combustion chamber according to claim 2, wherein said holding member and a part of said piston body are pre-stressed by plastically deforming the same with said holding member fixed to said piston body.

4. A piston structure with a heat insulated combustion chamber according to claim 3, wherein heat insulating layers extending from an outer circumferential surface of said flange toward a top surface of said piston body are formed between the portion of said holding member which is in the vicinity of said flange and said cavity of said piston body.

5. A piston structure with a heat insulated combustion chamber according to claim 4, wherein heat insulating members are interposed between an upper surface of said flange and said holding member, and between a lower surface of said flange and said piston body.

6. A piston structure with a heat insulated combustion chamber according to claim 5, wherein heat insulating layers are formed between a lower surface of said combustion chamber structure and said cavity of said piston body.

7. A piston structure with a heat insulated combustion chamber according to claim 6, wherein gaskets are provided between an outer circumferential surface of said combustion chamber structure and an inner circumferential surface of said holding member.

8. A piston structure with a heat insulated combustion chamber according to claim 7, wherein said flange of said combustion chamber structure comprises two vertically divided portions.

9. A piston structure with a heat insulated combustion chamber according to claim 8, wherein heat insulating gaskets are interposed between said upper and lower flange portions.

10. A piston structure with a heat insulated combustion chamber according to claim 2, wherein said combustion chamber structure is provided with a nozzle insert hole positioned in the central part of a top portion thereof, and communication ports formed around said nozzle insert hole so that said communication ports are spaced from one another and extend in the radial direction.

11. A piston structure with a heat insulated combustion chamber according to claim 1, wherein heat insulating layers extending from an outer circumferential surface of said flange toward a top surface of said piston body are formed between the portion of said holding member which is in the vicinity of said flange and said cavity of said piston body.

12. A piston structure with a heat insulated combustion chamber according to claim 1, wherein heat insulating members are interposed between an upper surface of said flange and said holding member, and between a lower surface of said flange and said piston body.

13. A piston structure with a heat insulated combustion chamber according to claim 1, wherein heat insulating layers are formed between a lower surface of said combustion chamber structure and said cavity of said piston body.

14. A piston structure with a heat insulated combustion chamber according to claim 1, wherein gaskets are provided between an outer circumferential surface of said combustion chamber structure and an inner circumferential surface of said holding member.

15. A piston structure with a heat insulated combustion chamber according to claim 1, wherein said combustion chamber structure is provided with a nozzle insert hole positioned in the central part of a top portion thereof, and communication ports formed around said nozzle insert hole so that said communication ports are spaced from one another and extend in the radial direction.

16. The piston structure according to claim 1, wherein the holding member is deformed plastically in a plurality of positions spaced apart in a circumferential direction, whereby clearances are left between the positions.

17. A piston structure with a heat insulated combustion chamber comprising a piston body provided with a cavity in a top portion thereof and formed out of a metal material, a combustion chamber structure provided in said cavity and formed out of a heat resisting material, a flange integral with said combustion chamber structure and projecting from an outer circumferential portion of a bottom wall thereof, and a holding member firmly fitted in said piston body and positioned on the outer side of an outer circumferential surface of said combustion chamber structure and above said flange, said holding member being firmly pressed so that said flange is pressed by said holding member against a bottom surface of said cavity of said piston body;

wherein said flange of said combustion chamber structure comprises two vertically divided portions.

18. A piston structure with a heat insulated combustion chamber according to claim 17, wherein heat insulating gaskets are interposed between said upper and lower flange portions.

19. A piston structure with a heat insulated combustion chamber according to claim 17, wherein said holding member is deformed elastically so that compressive residual stress is imparted in the holding member.

20. A piston structure with a heat insulated combustion chamber according to claim 17, wherein said combustion chamber structure is provided with a nozzle insert hole positioned in the central part of a top portion thereof, and communication ports formed around said nozzle insert hole so that said communication ports are spaced from one another and extend in the radial direction.

* * * * *